(12) United States Patent
Lai et al.

(10) Patent No.: US 6,768,635 B2
(45) Date of Patent: Jul. 27, 2004

(54) HAND-HELD ELECTRONIC DEVICE WITH HIDDEN KEYBOARD

(75) Inventors: Cheng-Shing Lai, Taipei (TW); Hao Pan, Nanjing (CN)

(73) Assignee: Inventec Appliances Corp., Taipei (TW)

(*) Notice: Subject to any disclaimer, the term of this patent is extended or adjusted under 35 U.S.C. 154(b) by 199 days.

(21) Appl. No.: 09/989,417

(22) Filed: Nov. 21, 2001

(65) Prior Publication Data

US 2003/0095375 A1 May 22, 2003

(51) Int. Cl.$^7$ ................................................. G06F 1/16
(52) U.S. Cl. ....................... 361/680; 361/683; 400/682; D14/331; 312/319.1; 312/223.6; 248/688; 248/351
(58) Field of Search .................................. 361/680, 651, 361/683; 400/682, 691–693; D14/331, 346, 426; 312/319.1, 223.1, 223.2, 223.6; 248/685, 931, 422, 455, 456, 454, 351

(56) References Cited

U.S. PATENT DOCUMENTS

| | | | |
|---|---|---|---|
| D298,537 S | * | 11/1988 | Walters et al. ............. D14/328 |
| D324,855 S | * | 3/1992 | Iino ........................... D14/331 |
| 5,287,245 A | * | 2/1994 | Lucente et al. ............. 361/680 |
| D360,193 S | * | 7/1995 | Franzen ...................... D14/331 |
| 5,629,832 A | * | 5/1997 | Sellers ........................ 361/680 |
| 5,673,169 A | * | 9/1997 | Wicks ......................... 361/680 |
| 5,927,673 A | * | 7/1999 | Kurokawa et al. .......... 248/456 |
| 6,301,101 B1 | * | 10/2001 | Anzai et al. ................ 361/683 |
| 6,483,445 B1 | * | 11/2002 | England ..................... 361/680 |
| 6,556,430 B2 | * | 4/2003 | Kuo et al. .................. 361/680 |

FOREIGN PATENT DOCUMENTS

| | | | | |
|---|---|---|---|---|
| DE | 3914857 A1 | * | 11/1990 | ............ H05K/5/00 |
| JP | 07013658 A | * | 1/1995 | ............. G06F/1/16 |

* cited by examiner

*Primary Examiner*—Lisa Lea-edmonds
(74) *Attorney, Agent, or Firm*—Birch, Stewart, Kolasch & Birch, LLP (57) ABSTRACT

A hand-held electronic device with a hidden keyboard, especially for small size electronic devices with a display screen (such as PDAs, mobile phones, etc), provides a keyboard coupling design to allow a retractable keyboard retreated and hidden inside a device body of the electronic device when not in use, and pulled out for data entry when in use.

10 Claims, 15 Drawing Sheets

FIG. 15

HAND-HELD ELECTRONIC DEVICE WITH HIDDEN KEYBOARD

FIELD OF THE INVENTION

The invention relates to a hand-held electronic device with a hidden keyboard and particularly a small information device (such as PDA, mobile phone) coupled with a keyboard for users to selectively enter data therewith.

BACKGROUND OF THE INVENTION

Rapid innovations and developments in communication technology now enable people using hand-held personal computers, personal digital assistants (PDA), mobile phones or other devices to access and enjoy a wide variety of added value services and multimedia information and contents from the Internet anytime anywhere.

Although the related technologies are well developed at present, there are still bottlenecks to be overcome in terms of accessing networks in mobile fashion. For instance, difficulty of data entry on small size information products (such as PDAs, mobile phones, etc.) is one of the problems not yet fully resolved. In order to facilitate carrying and offer desired portability, the small information products often are being made about the size of a human palm. They usually have a display screen for displaying messages, especially the PDAs. For a general PDA, the display screen almost occupies the entire casing with only a small space left for a few function keys. Data entry usually is done manually through a T P (Touch Panel). Mobile phones generally do not have display screens as large as the PDAs, and have numeric keys and some function keys on the casings. Nevertheless, when there is a need to enter a large amount of data, T P or numeric key data entry simply is too slow and cumbersome to meet users' requirements.

Figure 1:
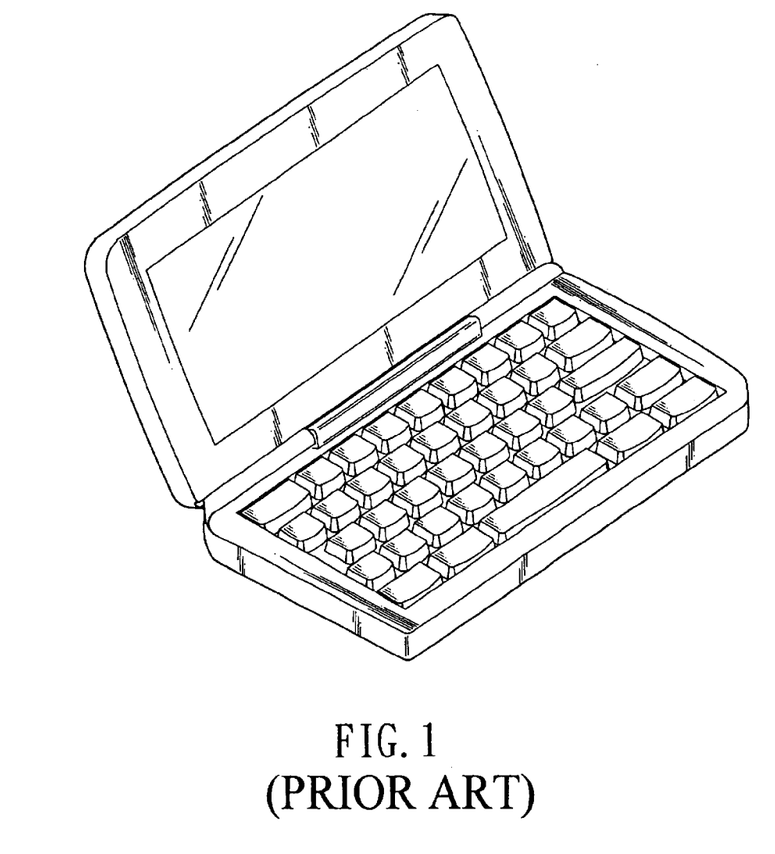
FIG. 1 is a schematic view of a conventional small size information product equipped with a keyboard.

To address the inconvenience of data entry on small size information products, there are designs equipped with attached keyboards now available on the market. FIG. 1 shows one of the examples that has a keyboard and a display screen facing each other. The keyboard and display screen are respectively mounted to two independent bodies and are engaged together through a hinge. When in use, open the product from the middle to extend and lay the display screen and keyboard. Then the keyboard may be used for data entry. When not in use, the bodies may be folded and the display screen will be encased in the bodies and not visible. As the product should be opened when in use, it is not user-friendly. The keyboard also is exposed to exterior when not in use and occupies an extra space.

SUMMARY OF THE INVENTION

In view of aforesaid disadvantages, the primary object of the invention is to provide a handheld electronic device with a keyboard for data entry that has a novel keyboard structure to allow the display screen visible from outside all the times and conceal the keyboard when not in use to save space.

To achieve the foregoing objects, the electronic device according to the invention is coupled with a retractable keyboard which may be hidden inside the device body when not in use and may be pulled out when in use to allow users entering data.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 2:
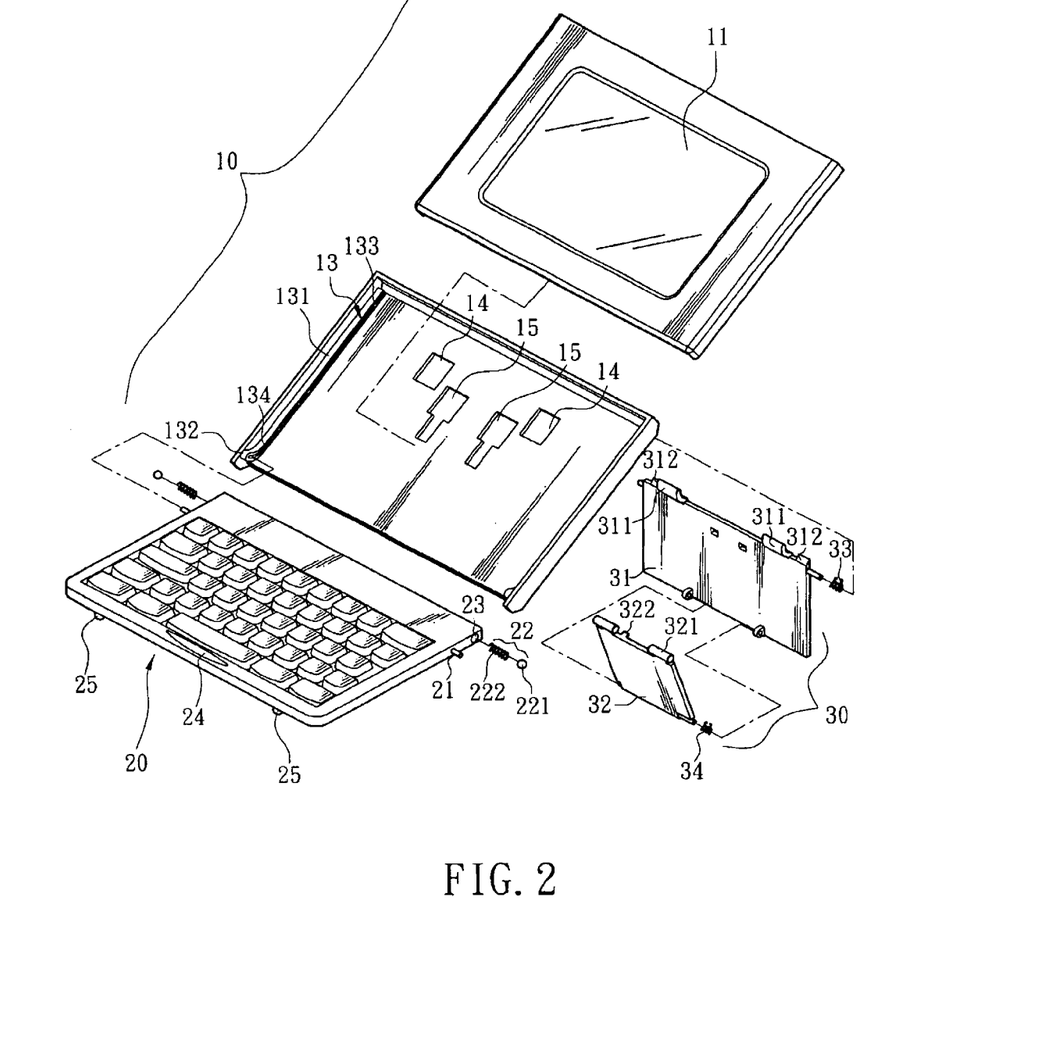
FIG. 2 is an exploded view of the invention.
Figure 3:
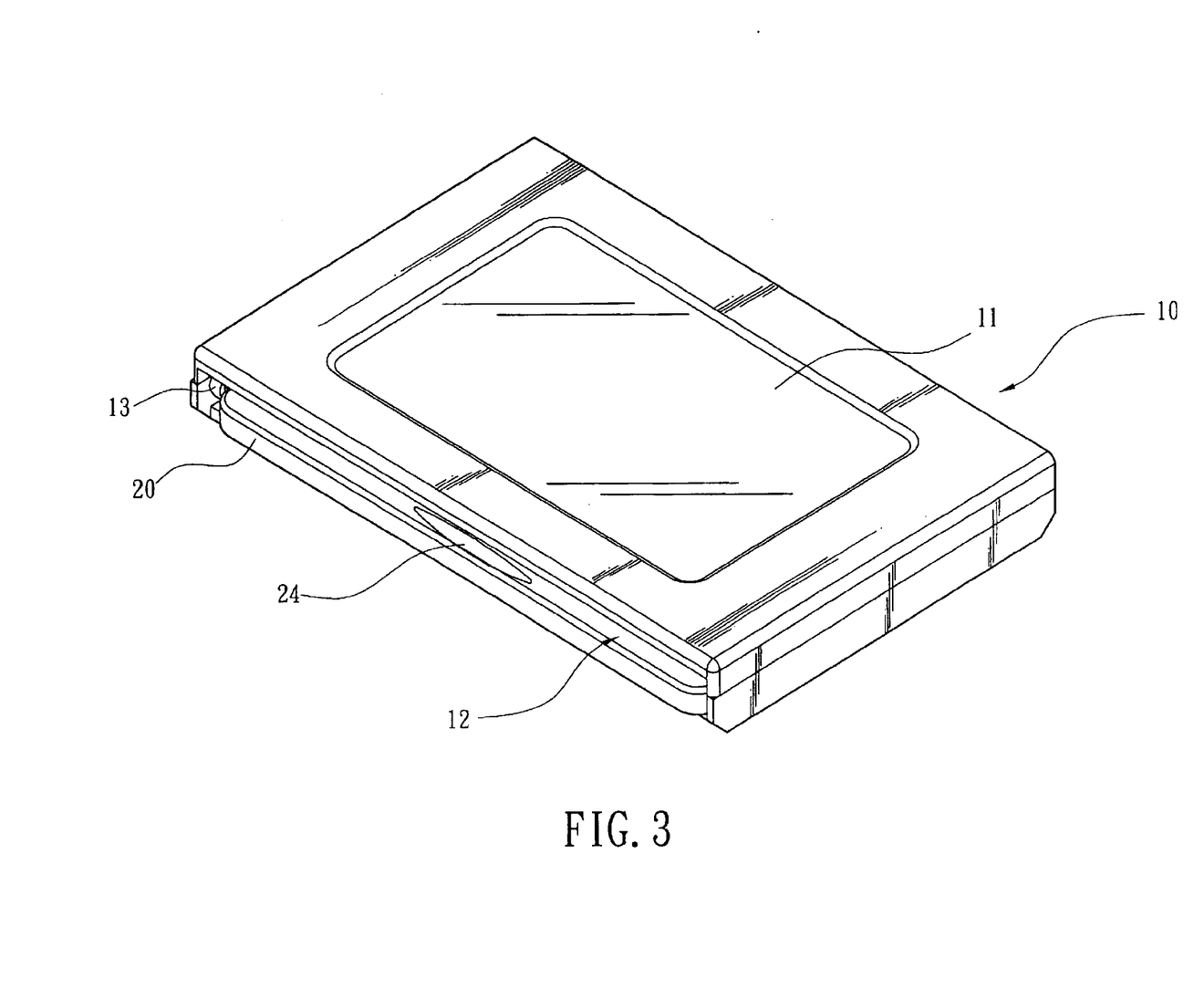
FIG. 3 is a perspective view of the invention.
Figure 4:
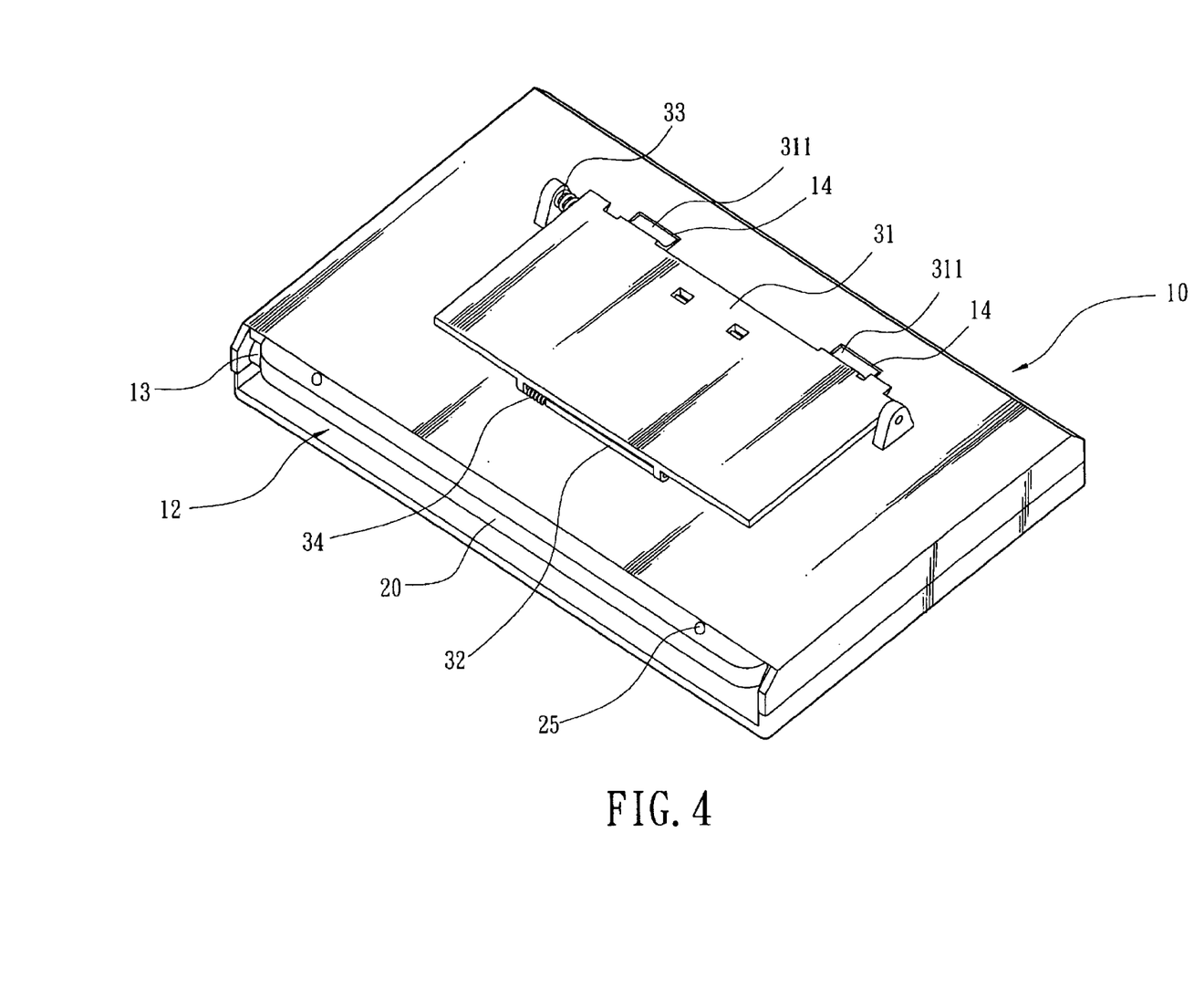
FIG. 4 is another perspective view of the invention.

Referring to FIGS. 2, 3 and 4, the hand-held electronic device of the invention includes of a device body 10, a keyboard 20 and a support frame 30.

Figure 5:
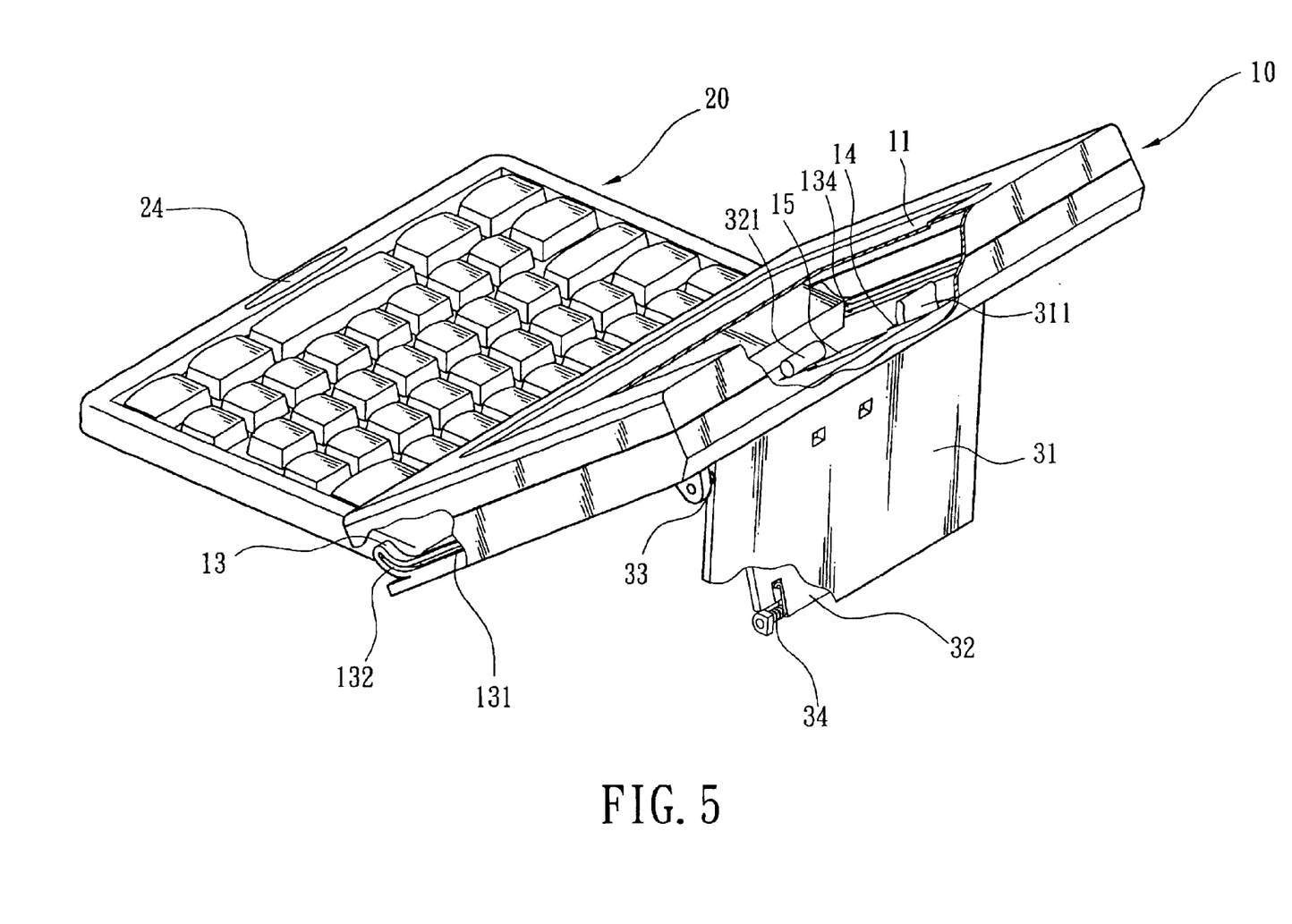
FIG. 5 is a perspective view of the invention, with the keyboard drawn out.

The device body 10 includes a display screen 11 located on a front side and a housing chamber 12 for holding and concealing the keyboard 20 in the device body. The keyboard 20 is movable in the housing chamber 12, and may be moved for a displacement relative to the device body 10 and exposed to the exterior of the device body 10 at a "use position" (as shown in FIG. 5), or be withdrawn and hidden inside the device body 10 at a "retreat position". At the "use position", the keyboard 20 is exposed to the exterior of the device body 10 for data entry. At the "retreat position", the keyboard 20 is hidden in the housing chamber 20.

Figure 6:
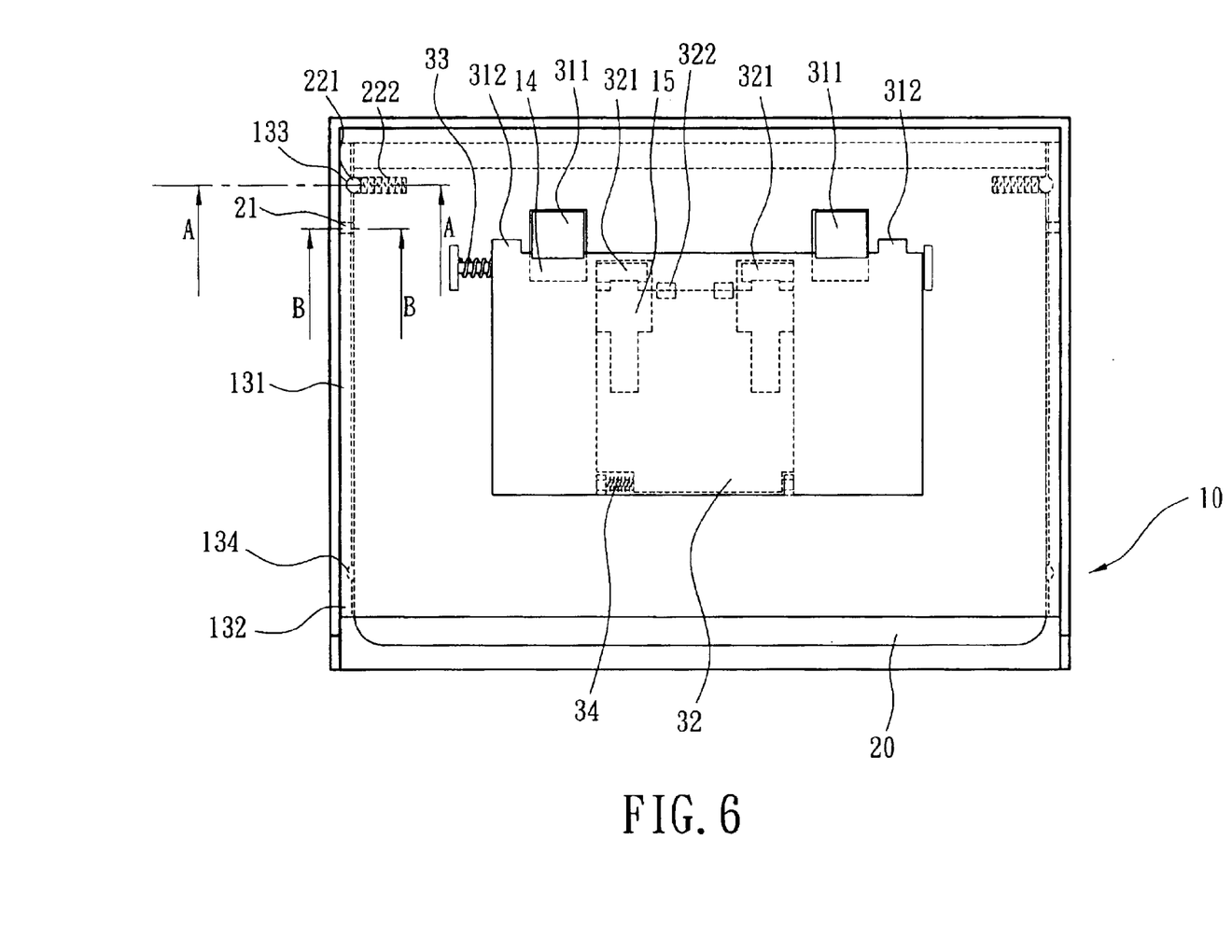
FIG. 6 is a schematic bottom view of the invention.
Figure 7:
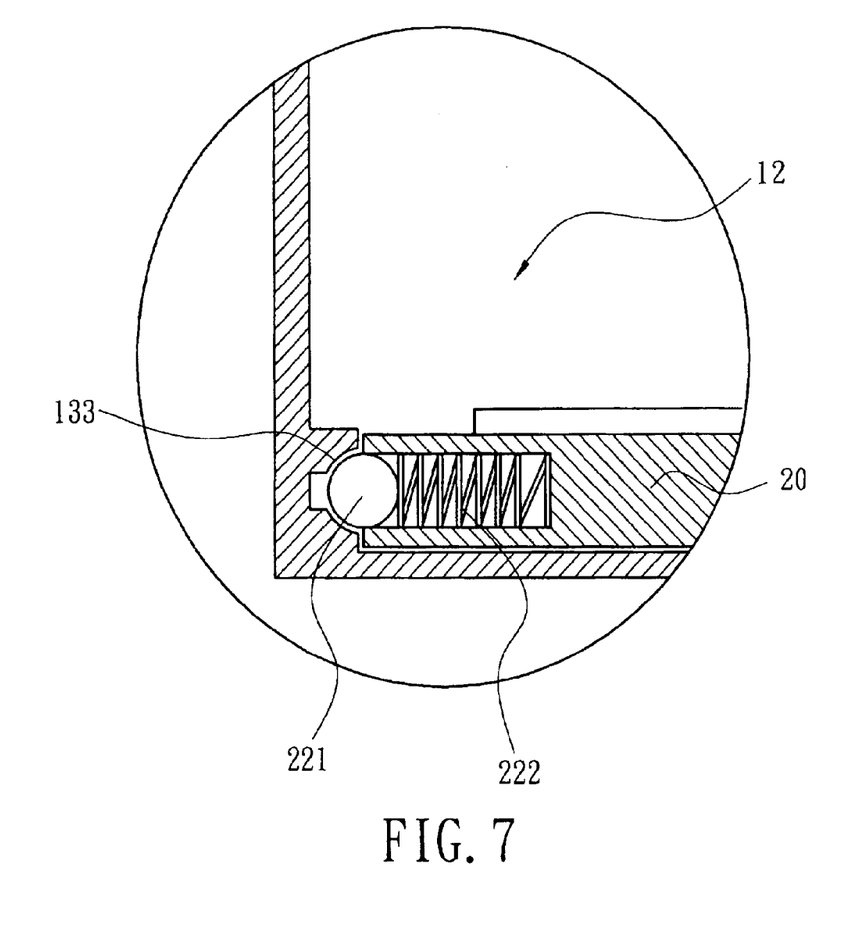
FIG. 7 is a cross section taken along line A—A in FIG. 6.

Referring to FIG. 6, the device body 10 and keyboard 20 have respectively a guide channel 13 and a matching stub shaft 21 on the adjacent sides. The stub shaft 21 is coupled with the guide channel 12 (shown in FIG. 7) and is slidable therein. In addition, the guide channel 13 includes a linear chute 131 and a curved chute 132. The curved chute 132 is located at the opening of the housing chamber 12 to allow the stub shaft 21 of the keyboard 20 engaging with an elastic anchor means 22 and moving in the curved chute 132 for a turned displacement (will be discussed below).

Figure 8:
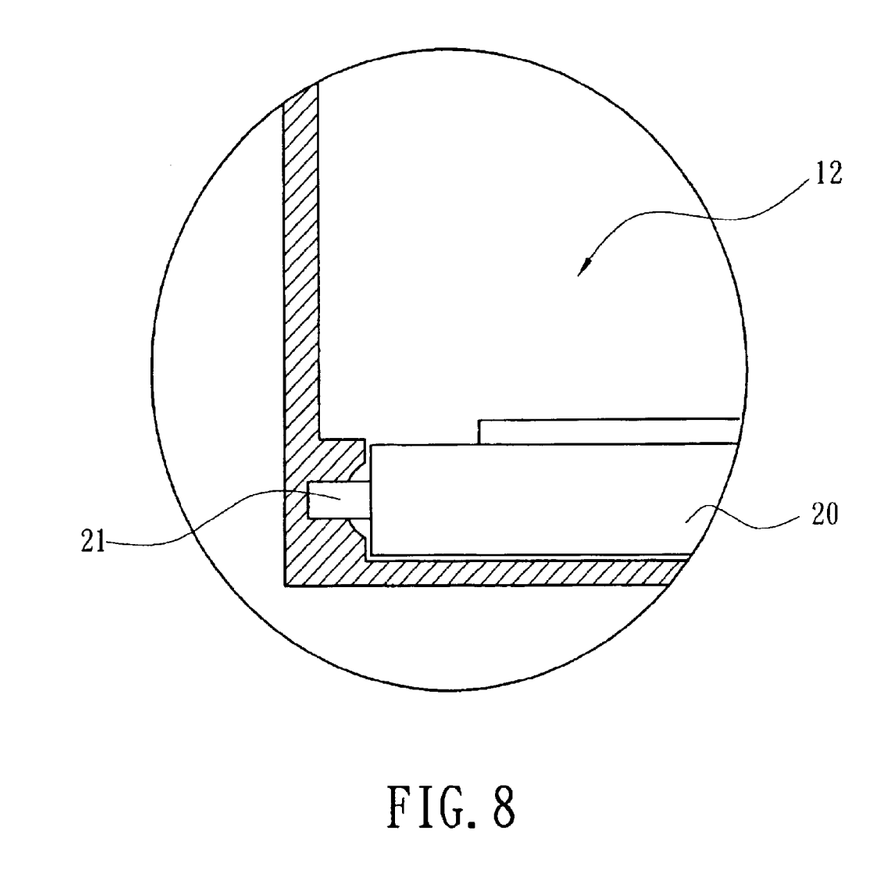
FIG. 8 is a cross section taken along line B—B in FIG. 6.
Figure 9:
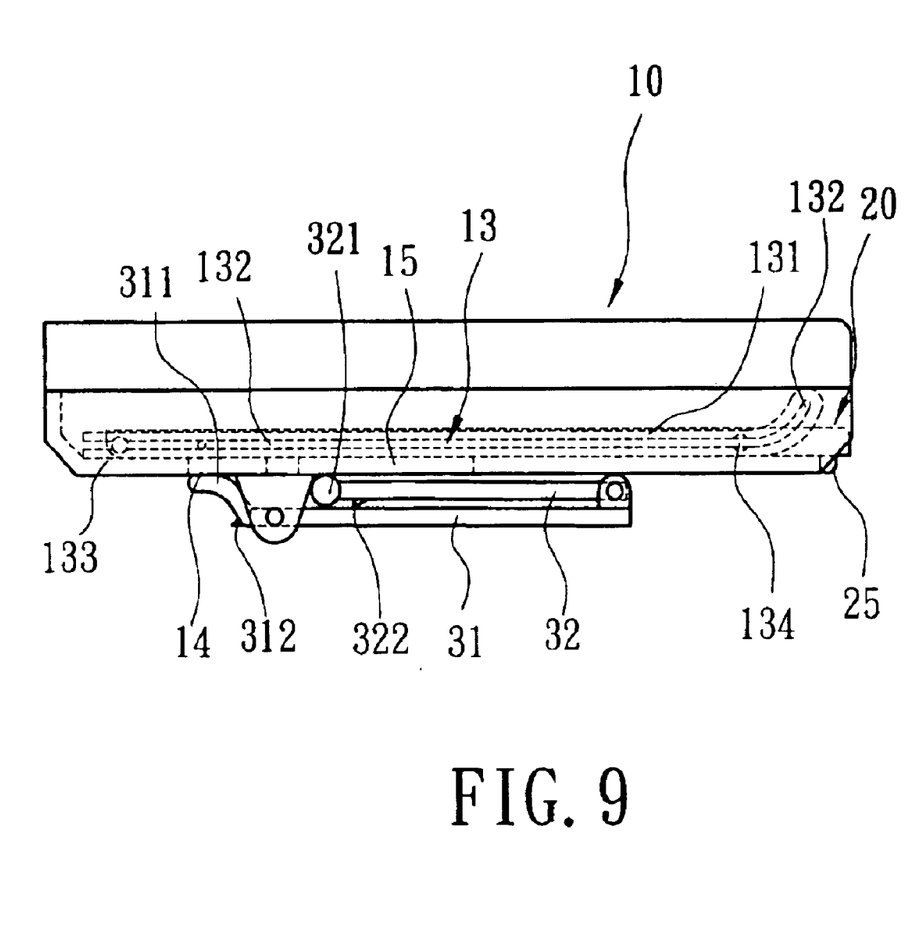
FIGS. 9–13 are schematic views for pulling out the keyboard from the device body.
Figure 10:
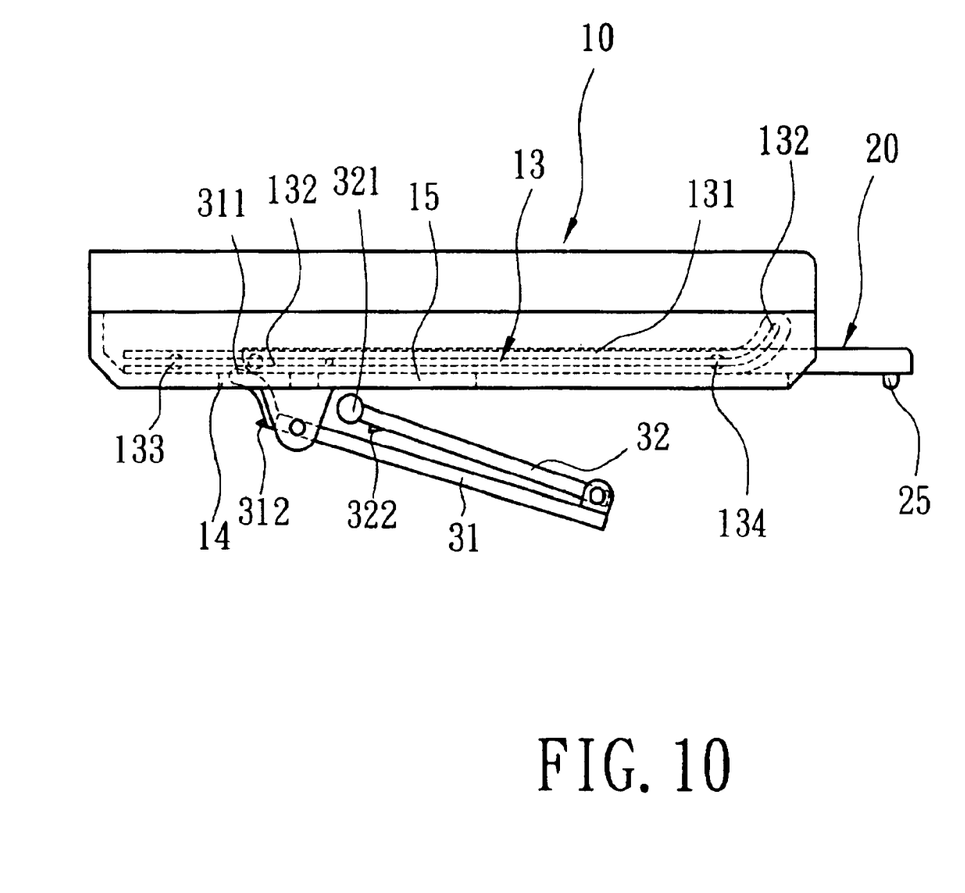
Figure 11:
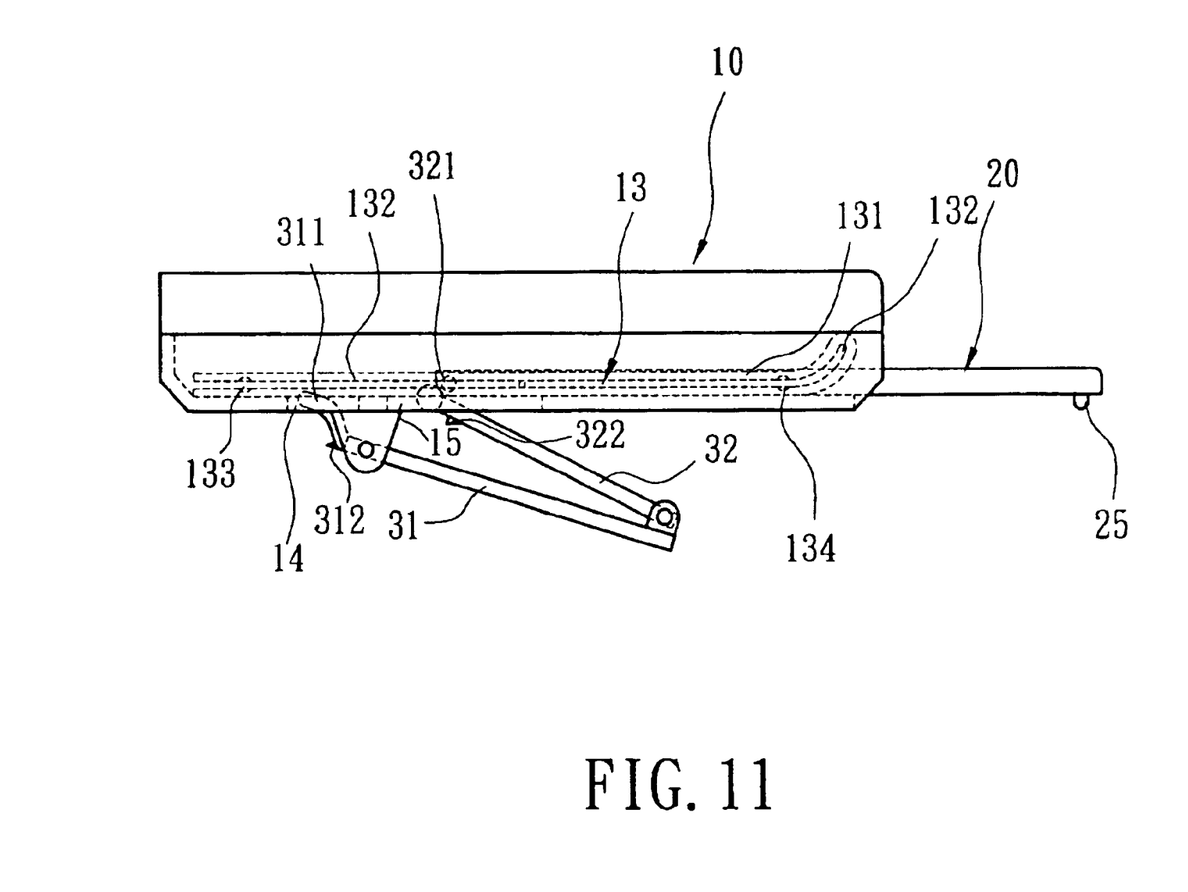
Figure 12:
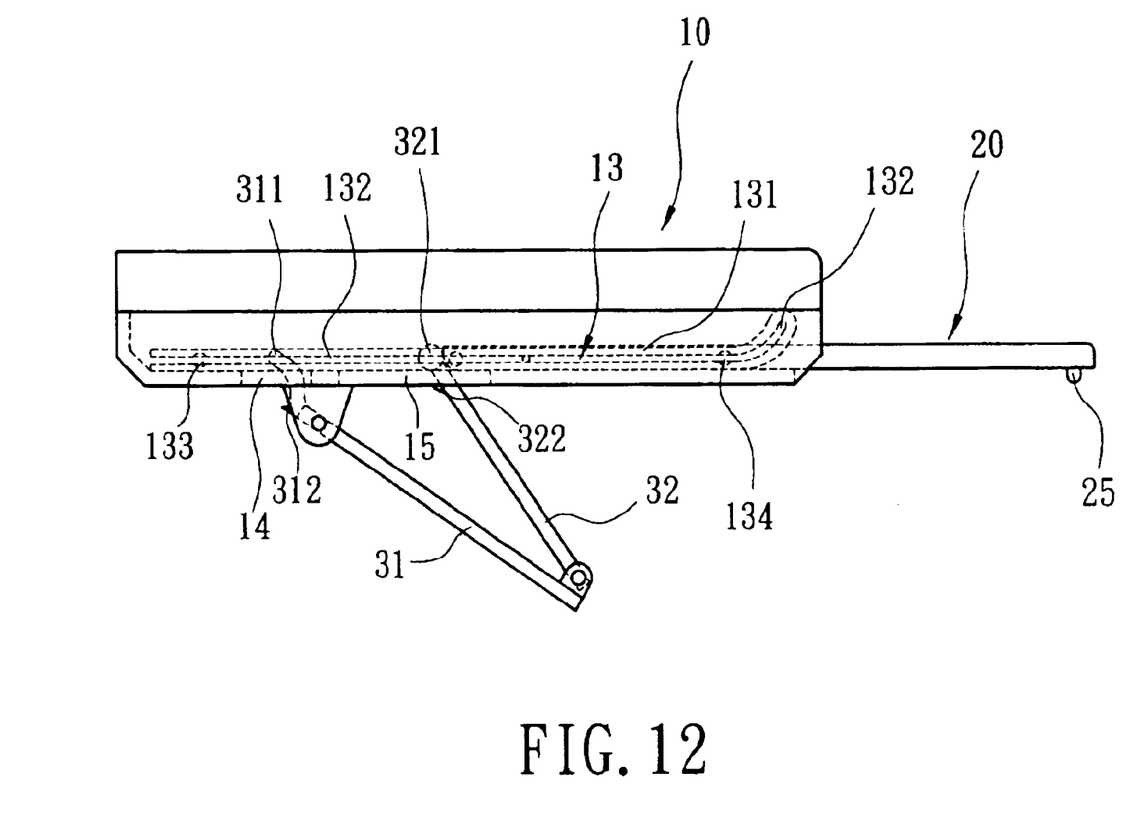
Figure 13:
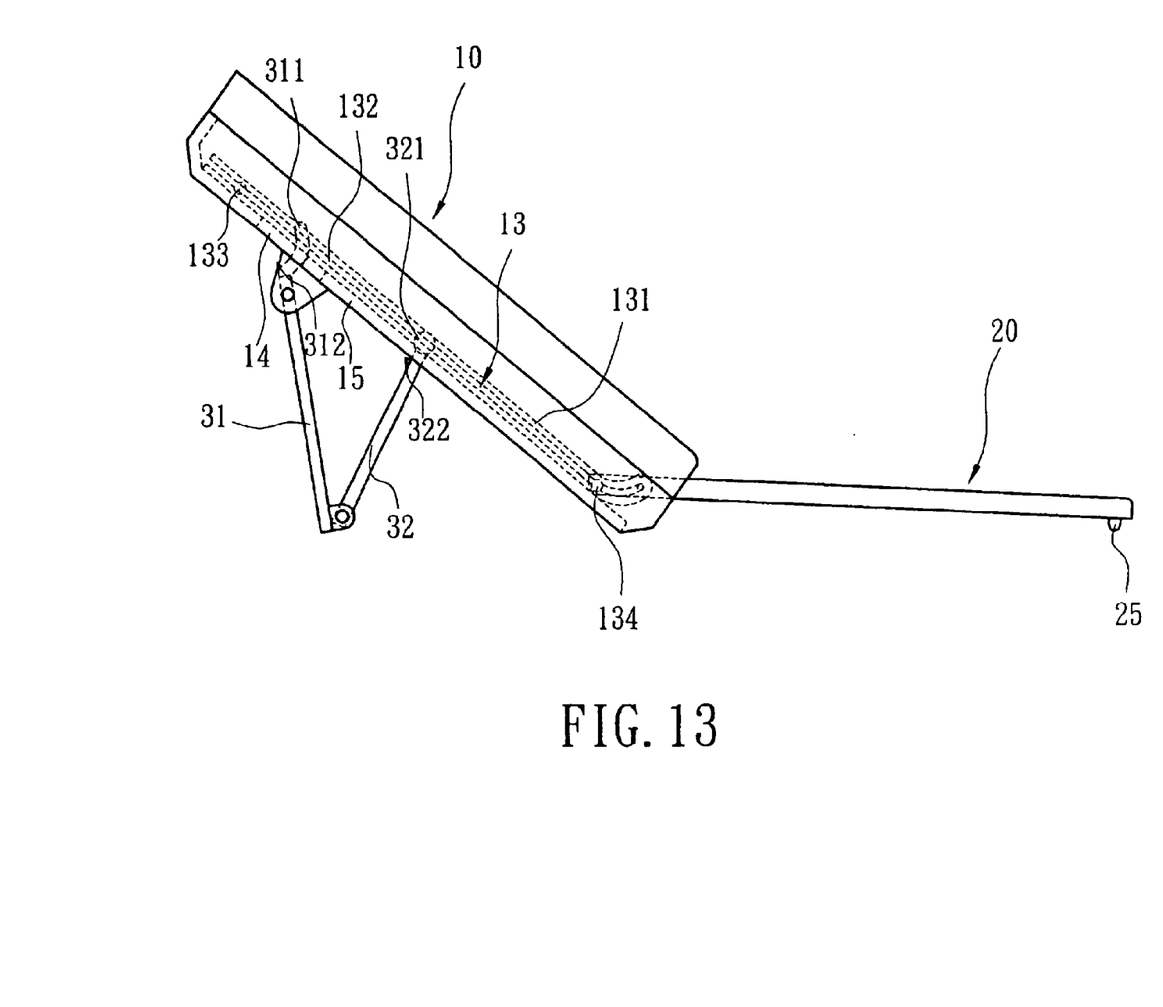

The elastic anchor means 22 is located in the keyboard 20 for wedging in the guide channel 13 to allow the keyboard 20 engaging with the device body 10 when moved to the "retreat position" and "use position". The elastic anchor means 22 includes an anchor ball 221 and an elastic element 222 located in a nest trough 23 formed in one side of the keyboard 20 for pressing the anchor ball 221 against the guide channel 13. The device body 10 also has matching anchor cavities 133 and 134 located in the guide channel 13 corresponding to the "retreat position" and "use position" to engage with the anchor ball 221. Hence when the keyboard 20 is moved to the "retreat position" and "use position", the keyboard 20 may form an anchored and latched relationship with the device body 10 (as shown in FIG. 8).

The support frame 30 is pivotally engaged with the back side of the device body 10. When the keyboard 20 is at the "retreat position", the support frame 30 is flatly folded on the device body 10. When the keyboard 20 is at the "use position", the support frame 30 is extended relative to the device body 10 to lift the device body 10 at an inclined angle on a supporting plane.

In one embodiment of the invention, the support frame 30 includes at least a main bracket 31 and a secondary bracket 32. The main bracket 31 has one end pivotally engaged with the back side of the device body 10 on a pivotal joint and has a depress blade 311 extended beyond the pivotal joint and reached the housing chamber 12 through a first opening 14 formed on the device body 10. The main bracket 311 has another end pivotally engaged with the secondary bracket 32. The pivotal joint on the device body 10 is coupled with a first torsional spring 33 for urging the main bracket 31 outwards relative to the device body 10. The secondary bracket 32 has one end formed a slide end 321 movable in the housing chamber 321 through a second opening 15 formed on the device body 10 and another end pivotally engaged with the main bracket 31 on another pivotal joint. The pivotal joint of the main bracket 31 and secondary bracket 32 is coupled with a second torsional spring 34. When the keyboard 20 is at the "use position", the first and second torsional springs 33 and 34 urge the main and secondary brackets 31 and 32 to form a selected extending angle so that the support frame 30 can support the back side of the device body 10 to make the device body 10 and keyboard 20 forming a suitable angle thereby users can operate the keyboard 20 and view the display screen 11. In the movements for pushing the keyboard 20 into the housing chamber 12, the main and secondary brackets 31 and 32 are harnessed by the depress blade 311 and channeled by the slide end 321 to fold gradually on the back side of the device body 10.

By means of aforesaid constructions, the device body 10 is coupled with a hidden keyboard 20 which may be pulled out for data entry whenever needed. In order to facilitate the movement of the keyboard, the keyboard 20 may have a pulling section 24 for users to grasp with hands. The keyboard 20 further may have at least one foot stub 25 jutting from the bottom side to keep the keyboard horizontal when pulled out for use.

Referring to FIGS. 9 through 13 for the operations of the invention in use, when the keyboard 20 is pulled outwards from the device body 10 for a selected displacement, the originally depressed main and secondary brackets 31, 32 will be extended because of the depress blade 311 and slide end 321 are relieved by the torsional springs 31 and 32. The main and secondary brackets 31, 32 will turn relative to the device body 10 and extend. The main and secondary brackets 31, 32 further have respectively at least one retain finger 312, 322 located thereon to contact the device body 10 so that the main and secondary brackets 31, 32 will be extended at a selected angle relative to each other without overrun (the selected angle is constant and may be set according to requirements, and may be altered by changing the length of the main and secondary brackets 31, 32. This technique is known in the art, and will be omitted here).

When the keyboard 20 is completely pulled out from the device body 10 and turned relative to the device body 10, the support frame 30 will lift the device body 10 to allow the display screen 11 tilted at a desired angle.

Figure 14:
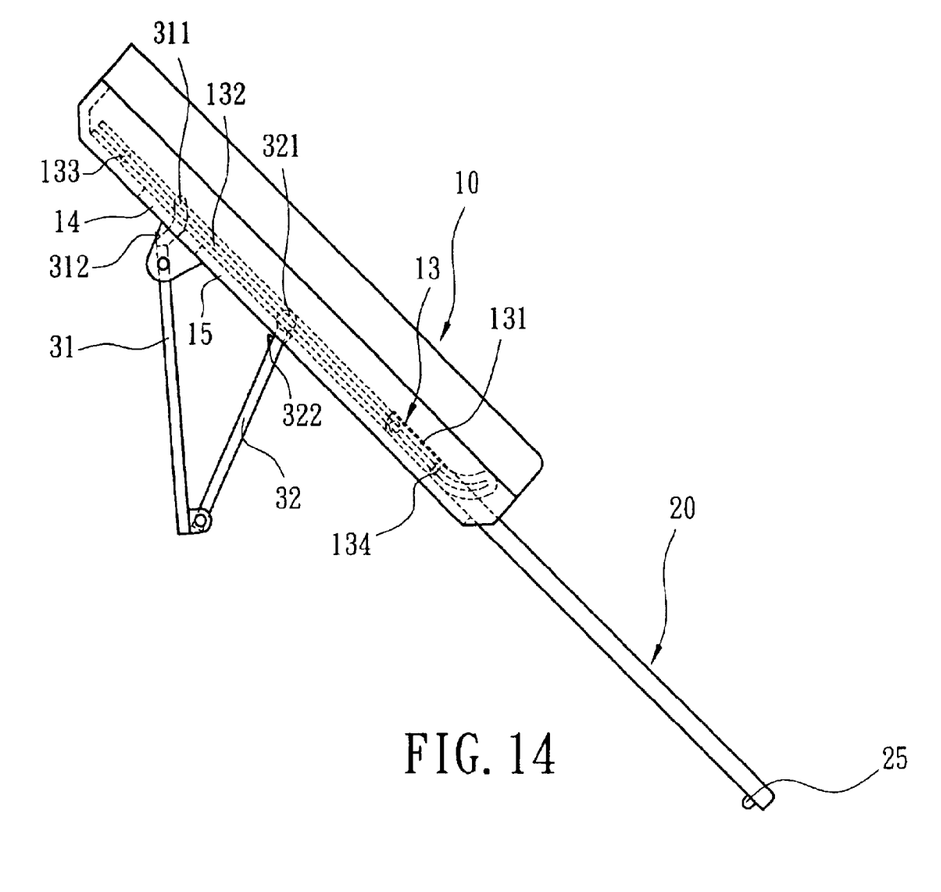
FIGS. 14–15 are schematic views for inserting the keyboard into the device body.
Figure 15:
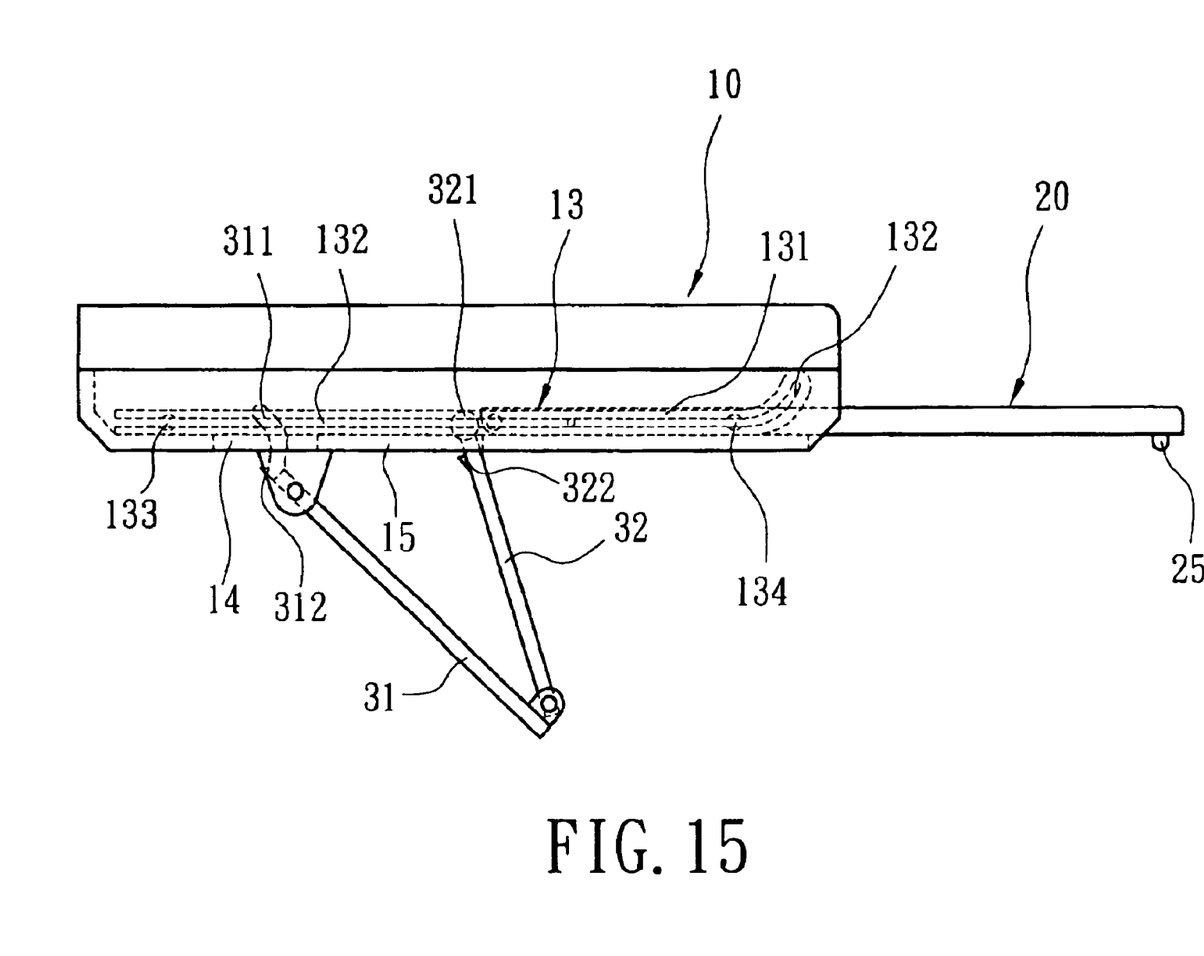

Referring to FIGS. 14 and 15, when the keyboard 20 is not in use, the keyboard 20 may be pushed into the housing chamber 12, and the main and secondary brackets 31, 32 may be folded and stacked on the bottom side of the device body 10.

The construction of the invention set forth above thus overcomes the disadvantage of difficult to make large data entry that happens to conventional hand-held devices. The keyboard 20 may be hidden inside the device body 10 when not in use to save total space of the device. The hidden design of the keyboard 20 allows the display screen 11 exposed to the exterior of the device body 10 and visible all the times to facilitate viewing. When the keyboard 20 is pulled out for use, the display screen 11 may also be positioned at a desired viewing angle.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A hand-held electronic device with a hidden keyboard for data entry, comprising: a device body having a display screen, on a front side and a housing chamber on an inside; a keyboard movable attached in the housing chamber for moving relative to the device body to an use position outside the device body and a retreat position retracting in the device body; and a support frame pivotally engaged with a back side of the device body and being extensible relative to the device body for the device body to form a selected inclined angle with a holding plane, wherein the device body and the keyboard have respectively a guide channel and a matching stub shaft located on adjacent sides thereof, and the stub shaft being coupled with the guide channel and slidable therein, wherein the keyboard further has an elastic anchor means for wedging in the guide channel, the elastic anchor means including an anchor ball and an elastic element to push the anchor ball against the guide channel, the device body further having two anchor cavities located in the guide channel corresponding respectively to the use position and the retreat position to engage with the anchor ball.

2. The hand-held electronic device with a hidden keyboard of claim 1, wherein the guide channel includes a linear chute and a curved chute, the curved chute being located at an opening of the housing chamber to allow the stub shaft of the keyboard engaging with an elastic anchor means and moving in the curved chute for a turned displacement.

3. The hand-held electronic device with a hidden keyboard of claim 1, wherein the keyboard has a nest trough to house an elastic element.

4. The hand-held electronic device with a hidden keyboard of claim 1, wherein the keyboard further has at least one foot stub located on a bottom side thereof.

5. The hand-held electronic device with a hidden keyboard of claim 1, wherein the keyboard further has at least one pulling section for moving the keyboard outwards from the device body.

6. The hand-held electronic device with a hidden keyboard of claim 1, wherein the support frame includes at least a main bracket and a secondary bracket; the main bracket having one end pivotally engaged with the back side of the device body on a first pivotal joint and having a depress blade extended into the housing chamber, and having another end pivotally engaged with the secondary bracket, the first pivotal joint being coupled with a first torsional spring for urging the main bracket outwards relative to the device body; the secondary bracket having one end formed a slide end movable in the housing chamber and another end pivotally engaged with the main bracket on a second pivotal joint, the second pivotal joint being coupled with a second torsional spring for extending the secondary bracket relative to the main bracket; and wherein when the keyboard is at the use position the first and the second torsional springs urge the main bracket and the secondary bracket to form the support frame to support the back side of the device body; when the keyboard is pushed into the housing chamber, the main bracket and the secondary bracket are harnessed by the depress blade and channeled by the slide end to gradually fold and stack on the back side of the device body.

7. The hand-held electronic device with a hidden keyboard of claim 6, wherein the device body has a first opening to allow the depress blade to pass through.

8. The hand-held electronic device with a hidden keyboard of claim 6, wherein the device body has a second opening to allow the slide end to pass through.

9. The hand-held electronic device with a hidden keyboard of claim 6, wherein the main bracket has at least one retain finger to limit the angle formed between the main bracket and the second bracket when extended.

10. The hand-held electronic device with a hidden keyboard of claim 6, wherein the secondary bracket has at least one retain finger to limit the angle formed between the main bracket and the second bracket when extended.

* * * * *